(12) United States Patent
Pendharkar et al.

(10) Patent No.: US 10,007,492 B2
(45) Date of Patent: Jun. 26, 2018

(54) SYSTEM AND METHOD FOR AUTOMATICALLY GENERATING DEVICE DRIVERS FOR RUN TIME ENVIRONMENTS

(71) Applicant: VAYAVYA LABS PVT. LTD, Belgaum (IN)

(72) Inventors: Sandeep Pendharkar, Bengaluru (IN); Venugopal Kolathur, Belgaum (IN); Karthick Gururaj, Bengaluru (IN)

(*) Notice: Subject to any disclaimer, the term of this patent is extended or adjusted under 35 U.S.C. 154(b) by 0 days. days.

(21) Appl. No.: 15/299,602

(22) Filed: Oct. 21, 2016

(65) Prior Publication Data

US 2017/0115969 A1     Apr. 27, 2017

(30) Foreign Application Priority Data

Oct. 21, 2015    (IN) .......................... 5673/CHE/2015

(51) Int. Cl.
*G06F 9/44*       (2018.01)
*G06F 8/35*       (2018.01)
*G06F 11/36*      (2006.01)

(52) U.S. Cl.
CPC ............ *G06F 8/35* (2013.01); *G06F 11/3616* (2013.01)

(58) Field of Classification Search
None
See application file for complete search history.

(56) References Cited

U.S. PATENT DOCUMENTS 9,330,227 B1* 5/2016 Han ................. G01R 31/31727

* cited by examiner

*Primary Examiner* — Chuck Kendall
(74) *Attorney, Agent, or Firm* — The Law Office of Austin Bonderer, PC; Austin Bonderer

(57) ABSTRACT

A system and method for automatically generating device driver codes for a device model based on an operation of said device model in verification environments is provided. The System includes a computing device. The computing device includes a device programming specification receiving module, a run time specification parsing module, a verification environment determination module and a driver generation module. The device programming specification receiving module receives at least one device programming specification aspects associated with an operation of device model in verification environment to determine a type of device driver code to be generated. The run time specification parsing module parses a run time specification file that includes verification environment parameters in run time specification. The verification environment determination module determines whether the verification environment equals to a part of a simulation/emulation in run time specification. The driver generation module automatically generates device driver code in pre-determined output programming language.

19 Claims, 12 Drawing Sheets

```
OS_SPEC {
    NAME= NO_OS
    ENV =  RTL_SIMULATION
}
CODE_GEN_SPEC {
    REGISTER_ACCESS = UVM
    DRIVER_CODE = C;
}
```

FIG. 3A

```
OS_SPEC{
    NAME = NO_OS;
    ENV= RTL_SIMULATION
}
CODE_GEN_SPEC {
    REGISTER_ACCESS = UVM
    DRIVER_CODE = SV;
}
```

FIG. 3B

```
OS_SPEC {
NAME = NO_OS;
ENV = VIRTUAL_PLATFORM;
}
CODE_GEN_SPEC {
REGISTER_ACCESS =
UVM_SYSTEMC;
DRIVER_CODE = C;
}
```

FIG. 3C

```
OS_SPEC {
NAME = NO_OS;
ENV = VIRTUAL_PLATFORM;
}
CODE_GEN_SPEC {
REGISTER_ACCESS =
UVM_SYSTEMC;
DRIVER_CODE = SYSTEMC;
}
```

FIG. 3D

```
VERIFICATION_SPEC {
  NAME = NO_OS;
  ENV = VIRTUAL_PLATFORM;
}
CODE_GEN_SPEC {
  REGISTER_ACCESS =
  UVM_SYSTEMC
  DRIVER_CODE = C;
}
```

FIG. 3E

```
OS_SPEC {
  NAME = NO_OS;
  ENV = VIP_SIMULATION;
}
```

FIG. 3F

```
OS_SPEC {
  NAME = NO_OS;
  ENV = RTL_EMULATION
}
CODE_GEN_SPEC {
  REGISTER_ACCESS =UVM
}
```

FIG. 3G

SYSTEM AND METHOD FOR AUTOMATICALLY GENERATING DEVICE DRIVERS FOR RUN TIME ENVIRONMENTS

CROSS-REFERENCE TO RELATED APPLICATIONS

This application claims priority to Indian patent application no. 5673/CHE/2015 filed on Oct. 21, 2015, the complete disclosure of which, in its entirely, is herein incorporated by reference.

BACKGROUND

Technical Field

The embodiments herein generally relate to data processing and, more particularly, to a system and method for automatically generating device driver codes in run time environments, specifically for design and verification of a device model.

Description of the Related Art

A device driver code generally refers to a software code (group of software instructions), that enables a software module to interface with a hardware device (e.g., a printer, a modem, a network controller card, and the like.). The device driver provides appropriate interfaces enabling various software modules (e.g., user applications, operating system components, and the like) executing in the computing device (or hardware components in the computing device) to communicate with and/or to control a hardware device.

A runtime specification captures various aspects of the runtime environment like a processor on which the device driver code may execute the operating system etc. Thus the methodology implicitly assumes the following scenario in which the driver needs to be executed. The following scenarios are (a) the present of the device model in a hardware form (i.e. a physical form), (b) a processor which executes the device driver code, (c) generation of the device driver code may be generated according to the characteristics of the operating environment captured in the runtime specification. But these methodologies do not cover the fact that a device driver code may be required even before the device is available in its physical hardware form and requisition of the device driver code. An implementation of the device model is written in a RTL even before the device model is available in its physical form. The RTL file is typically a text file which describes or characterizes the hardware and its behavior. Based on the RTL file, it is fabricated into its physical form of a peripheral (e.g. a USB controller). The RTL files need to be checked for finding the mistakes. However the device model may not be in a physical form in a verification environment. The device driver code may be required during the design and verification of the device model. There is no USB controller or hardware as such available, but there is a verilog file instead which can simulate the hardware and allow the user to interact with it by sending signals to it.

Also, the device driver code is different for different computing devices generally due to differences in hardware and software characteristics among computing devices. For example, different operating systems (or its absence) may require different software codes for operation as a device driver in the corresponding computing devices. Similarly, having different hardware (devices, registers, etc.) characteristics may also require different software codes.

According there remains a need for a system and method for generating a device driver code codes in run time environments, specifically for design and verification of a device model and even before the device model is available in its physical form.

SUMMARY

In view of the foregoing, an embodiment herein provides a system for automatically generating device driver codes for a device model based on an operation of the device model in verification environments. The system includes a computing device (a) a device driver generator tool, (b) a memory unit and (c) a processor. The device driver generator tool that generates a device driver code for the device model. The memory unit stores (i) a database and (ii) a set of modules. The processor executes the set of modules. The set of modules include a device programming specification receiving module, a run time specification parsing module, a verification environment determination module and a driver generation module. The device programming specification receiving module, implemented by the processor, receives at least one device programming specification that includes aspects associated with an operation of the device model in the verification environment to determine a type of device driver code to be generated. The device programming specification receiving module includes device programming specification parsing module that parses a file that includes the device programming specification. The run time specification parsing module, implemented by the processor, parses a run time specification file that includes one or more verification environment parameters in run time specification. The verification environment determination module, implemented by the processor, determines whether the verification environment equals to a part of a simulation or an emulation in the run time specification. The driver generation module, implemented by the processor, (a) obtains the pre-determined output programming language, and (b) automatically generates the device driver code in the predetermined output programming language to enable a communication between a test bench interface and the device model in the verification environment to test the device model when the verification environment is equal to the simulation/emulation in the run time specification. The verification environment determination module determines a pre-determined output programming language for the device driver code and communicates the pre-determined output programming language.

In an embodiment, the part of the simulation/emulation is selected from a group comprising a Verification IP (VIP) simulation, a register transfer level (RTL) simulation, an RTL emulation or a virtual platform until a match is found.

In another embodiment, the verification environment determination module further includes a simulation determination module. The simulation determination module (i) determines whether the verification environment equals to the RTL simulation, (ii) determines whether the verification environment equals to the VIP simulation, (iii) determines whether the device driver code is in the pre-determined output programming language when the verification environment is equal to the VIP simulation or the RTL simulation and (iv) determines whether a register access equals to a universal verification methodology (UVM) when the device driver code is in the pre-determined output programming language in the VIP simulation or the RTL simulation.

In yet another embodiment, the verification environment determination module further includes a virtual platform determination module. The virtual platform determination module (i) determines whether the verification environment equals to a virtual platform, (ii) determines whether the device driver code is in the pre-determined output programming language when the verification environment is equal to the virtual platform, (iii) determines whether register access equals UVM_SystemC when the device driver code is in the pre-determined output programming language in the virtual platform and (iv) determines whether the verification environment equals to the RTL emulation.

In yet another embodiment, the verification environment determination module further includes a SystemC determination module. The SystemC determination module (a) determines whether the register access equals to a SystemC and (b) determines whether the register access equals UVM_SystemC when the device driver code is equal to the SystemC.

In yet another embodiment, the verification environment determination module further includes a System Verilog determination module. The System Verilog determination module (a) determines whether the device driver code equals to a System Verilog (SV) and (b) determines whether the register access equals to the universal verification methodology when the device driver code is equal to the System Verilog in the VIP simulation or the RTL simulation.

In yet another embodiment, the driver generation module further (i) generates the device driver code in the pre-determined output programming language along with a register access code using UVM register abstraction layer (RAL) application programming interface (API) when the register access is equal to the universal verification methodology (UVM) in the RTL simulation or the VIP simulation, or (ii) generates the device driver code in the pre-determined output programming language using stub API's when the register access is not equal to universal verification methodology in the RTL simulation or the VIP simulation.

In yet another embodiment, the driver generation module further (i) generates the device driver code in the pre-determined output programming language along with a register access code using UVM_SystemC RAL API's when the register access is equal to the UVM_SystemC in the virtual platform and (ii) generates the device driver code in the pre-determined output programming language along with a register access code using the stub API's when the register access is not equal to the UVM_SystemC in the virtual platform.

In yet another embodiment, the driver generation module further (i) generates the device driver code in the SystemC along with a register access code using UVM_SystemC RAL API when the register access is equal to the UVM_SystemC and (ii) (ii) generates the device driver code in the SystemC along with a register access code using stub API's when the register access is not equal to the UVM_SystemC in the virtual platform.

In yet another embodiment, the driver generation module further generates the device driver code in other output programming language when the device driver code is not equal to the System Verilog. The other output programming language is selected from a group comprising Vera, E, Python or Perl.

In yet another embodiment, the driver generation module further (i) generates the device driver code in the System Verilog along with a register access code using UVM RAL System Verilog API's when the register access is equal to the universal verification methodology (UVM) in the VIP simulation or the RTL simulation and (ii) generates the device driver code in the System Verilog along with a register access code using stub API's when the register access is not equal to the universal verification methodology (UVM) in the VIP simulation or the RTL simulation.

In yet another embodiment, the verification environment determination module further (i) determines whether the device driver code is in the pre-determined output programming language when the verification environment is equal to the RTL emulation and (ii) determines whether a register access equals to a universal verification methodology (UVM) when the device driver code is in the pre-determined output programming language in the RTL emulation.

In yet another embodiment, the System Verilog determination module (a) determines whether the device driver code equals to a System Verilog (SV) and (b) determines whether the register access equals to the universal verification methodology when the device driver code is equal to the System Verilog in the RTL emulation.

In yet another embodiment, the driver generation module further (a) generates the device driver code in the pre-determined output programming language along with a register access code using UVM register abstraction layer (RAL) application programming interface (API) when the register access is equal to the universal verification methodology (UVM) in the RTL emulation or (b) generates the device driver code in the pre-determined output programming language using stub API's when the register access is not equal to universal verification methodology in the RTL emulation.

In yet another embodiment, the driver generation module further (a) generates the device driver code in the System Verilog along with a register access code using UVM RAL System Verilog API's when the register access is equal to the universal verification methodology (UVM) in the RTL emulation or (b) generates the device driver code in the System Verilog along with a register access code using stub API's when the register access is not equal to the universal verification methodology in the RTL emulation.

In an aspect, one or more non-transitory computer readable storage mediums storing one or more sequences of instructions, which when executed by one or more processors, performs a method for generating device driver codes for a device model based on an operation of the device model in verification environments. The method includes the following steps of: (i) receiving at least one device programming specification that includes aspects associated with an operation of the device model in the verification environment to determine a type of device driver code to be generated; (ii) parsing a run time specification file that includes one or more verification environment parameters in run time specification; (iii) determining whether the verification environment equals to a part of a simulation/emulation in the run time specification; (iv) automatically generating said device driver code in said pre-determined output programming language. The device driver code is generated so that it is specific to the simulation or said emulation in the run time specification. The pre-determined output programming language is determined for the device driver code and communicated the pre-determined output programming language. The part of the simulation/emulation is selected from a group comprising a Verification IP (VIP) simulation, a register transfer level (RTL) simulation, an RTL emulation or a virtual platform until a match is found. The determining further includes the steps of: (a) determining whether the verification environment equals to the RTL simulation; (b) determining whether the verification environment equals to the VIP simulation in the run time specification; (c) determining whether the device driver code is in the pre-determined output programming language when the verification environment is equal to the VIP simulation or the RTL simulation and (d) determining whether a register access equals to a universal verification methodology (UVM) when the device driver code is in the pre-determined output programming language in the VIP simulation or the RTL simulation. The generating further includes the steps of: (a) generating the device driver code in the pre-determined output programming language along with a register access code using UVM register abstraction layer (RAL) application programming interface (API) when the register access is equal to the universal verification methodology (UVM) in the RTL simulation or the VIP simulation; or (b) generating the device driver code in the pre-determined output programming language using stub API's when the register access is not equal to universal verification methodology in the RTL simulation or the VIP simulation.

In an embodiment, the method further includes the step of: (a) determining whether the verification environment equals to a virtual platform in the run time specification; (b) determining whether the device driver code is in the pre-determined output programming language when the verification environment is equal to the virtual platform; (c) determining whether register access equals UVM_SystemC when the device driver code is in the pre-determined output programming language when the verification environment is equal to the virtual platform; and (d) generating the device driver code in the pre-determined output programming language along with a register access code using UVM_SystemC RAL API's when the register access is equal to the UVM_SystemC in the virtual platform; or (e) generating the device driver code in the pre-determined output programming language along with a register access code using the stub API's when the register access is not equal to the UVM_SystemC in the virtual platform.

In another embodiment, the method further includes the step of: (a) determining whether the device driver code equals to SystemC when the device driver code is not in the pre-determined output programming language in the virtual platform; (b) determining whether the register access equals UVM_SystemC when the device driver code is equal to the SystemC; and (c) generating the device driver code in the SystemC along with a register access code using SystemC RAL API when the register access is equal to the UVM_SystemC in the virtual platform; or (d) generating the device driver code in the SystemC along with a register access code using stub API's when the register access is not equal to the UVM_SystemC in the virtual platform.

In yet another embodiment, the method further includes the step of: (a) determining whether the device driver code equals to a System Verilog (SV) when the device driver code is not in the pre-determined output programming language in the VIP simulation or the RTL simulation; (b) determining whether the register access equals to the universal verification methodology when the device driver code is equal to the System Verilog in the VIP simulation or the RTL simulation; and (c) generating the device driver code in the System Verilog along with a register access code using UVM RAL System Verilog API's when the register access is equal to the universal verification methodology (UVM) in the VIP simulation or the RTL simulation; or (d) generating the device driver code in the System Verilog along with a register access code using stub API's when the register access is not equal to the universal verification methodology (UVM) in the VIP simulation or the RTL simulation.

In yet another embodiment, the method further includes the step of: (a) determining whether the device driver code is in the pre-determined output programming language when the verification environment is equal to the RTL emulation; (b) determining whether the register access equals to a universal verification methodology (UVM) when the device driver code is in the pre-determined output programming language in the RTL emulation; (c) determining whether the device driver code equals to the System Verilog (SV); (d) determining whether the register access equals to the universal verification methodology when the device driver code is equal to the System Verilog in the RTL emulation; and (e) generating the device driver code in the pre-determined output programming language along with a register access code using UVM register abstraction layer (RAL) application programming interface (API) when the register access is equal to the universal verification methodology (UVM) in the RTL emulation; (f) generating the device driver code in the pre-determined output programming language using stub API's; (g) generating the device driver code in the System Verilog along with a register access code using UVM RAL System Verilog API's when the register access is equal to the universal verification methodology (UVM) in the RTL emulation; or (h) generating the device driver code in the System Verilog along with a register access code using stub API's when the register access is not equal to the universal verification methodology in the RTL emulation.

In another aspect, the computer implemented method for generating device driver codes for a device model based on an operation of said device model in verification environments is provided. The method includes the following steps of: (a) receiving at least one device programming specification that comprises aspects associated with an operation of said device model in the verification environment to determine a type of device driver code to be generated; (b) parsing a run time specification file that comprises a plurality of verification environment parameters in run time specification; (c) determining whether the verification environment equals to a part of a Verification IP (VIP) simulation, a register transfer level (RTL) simulation, an RTL emulation or a virtual platform and (d) automatically generating the device driver code in the pre-determined output programming language. The device driver code is generated so that it is specific to the simulation or the emulation in the run time specification.

In an embodiment, the determining further includes the step of: (a) determining whether the verification environment equals to the RTL simulation; (b) determining whether the verification environment equals to the VIP simulation in the run time specification; (c) determining whether the device driver code is in the pre-determined output programming language when the verification environment is equal to the VIP simulation or the RTL simulation and (d) determining whether a register access equals to a universal verification methodology (UVM).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3A-3G illustrate several exemplary run time specifications (RTS) for generating a device driver code to be executed in a verification environment, in accordance with an exemplary scenario;

DETAILED DESCRIPTION OF PREFERRED EMBODIMENTS

Figure 1:
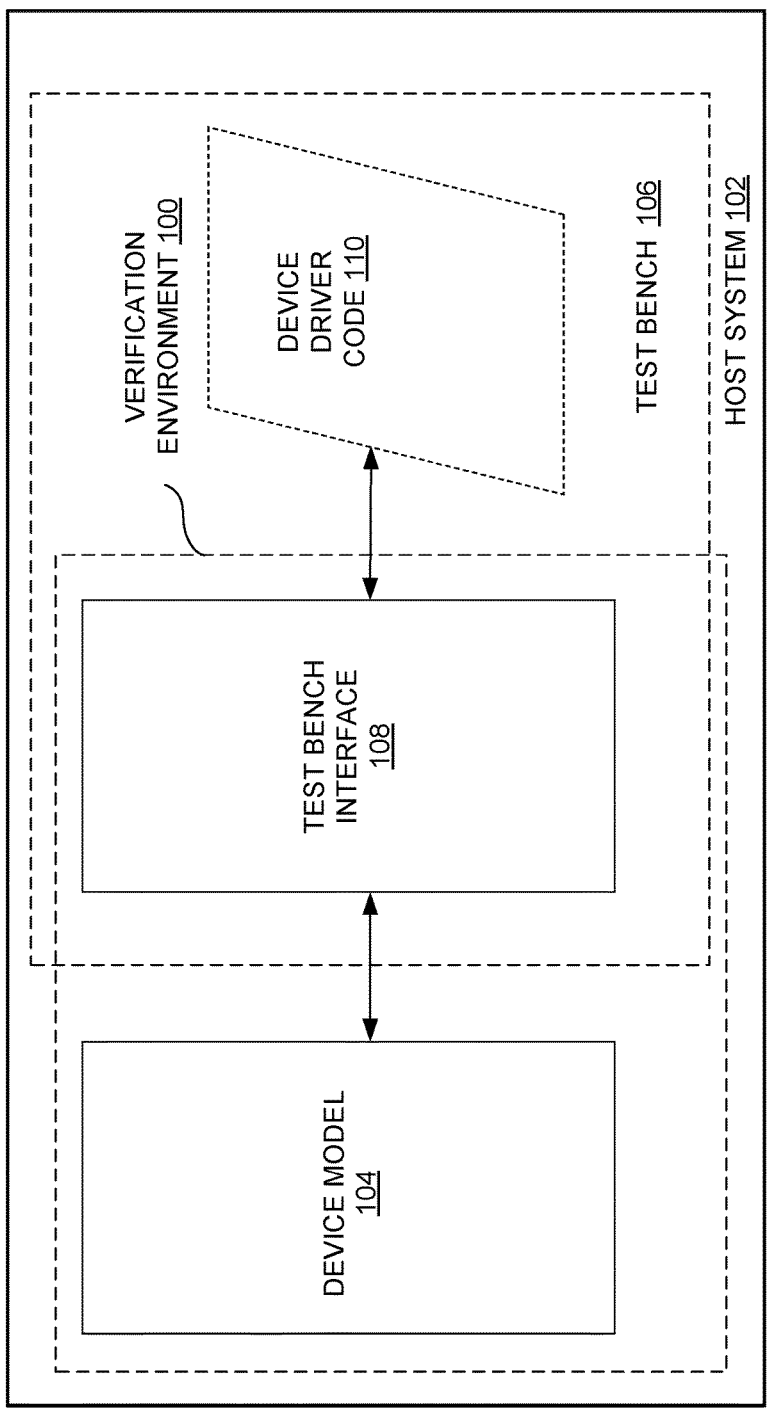
FIG. 1 is a block diagram representation of an exemplary verification environment, in accordance with an exemplary scenario.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Pursuant to an exemplary scenario, a register-transfer level (RTL) model of a device may undergo an extensive verification on a computer system before its physical form is available, where the verification may involve development of a test bench software to thoroughly verify the RTL model. The test bench software and the RTL model may be compiled and simulated (for the purpose of testing and verification) using simulation tools. The test bench software may need a device driver code to communicate with the RTL model being verified, wherein the term "device driver code" refers to an implementation of programming interface of the device for various purposes such as, a device initialization and a device cleanup, configuring a device, enabling/disabling various device features, handling of device interrupts and performing other operations like transmit or receive data (as applicable for the device). Similarly, a virtual model of a device (often in a language such as C or SystemC) may be used to enable an early software development and may have to undergo testing and verification before being handed over for the aforesaid early software development. The virtual model verification process may need a device driver code for communication with the virtual model of the device.

Similarly, during verification of the RTL model, another device model (sometimes referred to as a verification model or verification IP) may typically be used to model an interface end of the RTL model. For example, if the RTL model is of a universal serial bus (USB) host controller, then the verification model may be of a USB device controller to connect to an interface of a host controller RTL. A test bench software communicating with the verification model may thus need a device driver as well. Also, while an RTL model is being verified on an emulation box (a specialized hardware) possibly along with other RTL models, the emulation box may be connected to a host computer system and the test bench software may execute on the host computer system. In such circumstances the test bench software may need a device driver code to communicate with the RTL model. In all of the above recited scenarios, the "device driver codes" all implement the programing interface of the device, the implementation of the device driver code in each scenarios differs from others in many aspects, based on factors such as the verification environment in which the device driver is used, the language of implementation (such as, C, SystemVerilog, SystemC, and the like), mode of communication with the device, primitives used for delays, synchronization, and the like.

The existing approach is to implement these device driver codes for the test bench manually, in which a programming personnel writes the device driver code manually), and the manual implementation of the device driver codes may be performed independent of each other in the above mentioned scenarios. However, implementing the device driver codes for test bench software manually has several drawbacks, such as increased effort and cost of implementation and increased probability of errors in implementation. The system and method described herein enables generation of device driver codes for enabling communication between a test bench and a device model in various verification/operating environments in which the device is not available in its physical form, such as those listed above.

FIG. 1 is a block diagram representation of an exemplary verification environment 100, in which various embodiments of the present technology may be deployed, in accordance with an exemplary scenario. The exemplary verification environment 100 includes a host system 102 including a device model 104 communicatively associated with a test bench 106. The term verification environment 100 refers to an environment in which a device model 104 gets tested for functional correctness, where the device model 104 may include for example, an RTL model of a device implemented in for example, a hardware design language such as SystemVerilog, Verilog or VHDL, a virtual model of the device in a device programming language such as for example, C or SystemC, a verification model of the device model 104 used to model an interface during verification of the RTL model, and the like. The environment may create invalid and unexpected as well as valid and expected conditions to test the design of the device model 104. The test bench 106 may include a testbench interface 108 configured to manage interface between a device driver code 110 and the device model 104. In an embodiment, the system of the present technology enables generation of the device driver code 110 for enabling communication between the test bench 106 and the device model 104.

The communication may be orchestrated by the test bench interface 108. The device model 104 may include one or more registers, functioning as a storage medium of the device model 104. The device model 104 is typically an implementation of a device functionality at various abstraction levels depending upon the end-use of that particular model. The RTL model of the device is typically implemented in a Hardware Design Language (HDL) and the end use case is to be able to synthesize the actual silicon (i.e. the device in its physical form). A SystemC model is an implementation of the device at a higher abstraction level. The end use case could be synthesizing of the actual silicon or the model might be a part of virtual platform used for tasks like product software development or architectural exploration. The abstraction level typically pertains to the granularity and the level of details to which device characteristics, its features are modeled or implemented. An HDL like Verilog or VHDL is a low level implementation language and allows device operations and characteristics to be modeled to the lowest level of detail. The SystemC enables capturing the device model 104 at a more coarse granularity and some device characteristics maybe omitted (or abstracted out) depending upon the final use case. The device model 104 may include for example, a register transfer level (RTL) model of the device, also known as the design under test (DUT). This may be the RTL design being verified. In an embodiment, the DUT may be connected to a functional model (BFM) (not shown) that simulates an I/O bus the DUT is connected to. The device model 104 may accept bus read and write commands from higher layers and translates them into bus transactions at a device interface. The test bench 106 may consists of test scenarios designed to thoroughly test the device model 104 in various modes. The test bench 106 may also include several additional modules (not shown), including monitors, coverage points, scoreboards, to check whether the device model 104 behaves in a desired manner during the tests and whether the tests have covered the entire device functionality. The test bench 106 may also include additional modules (not shown) for providing services such as inserting delays, notifying events, creation/scheduling of tasks, heap/stack memory management, and the like. The implementation of each of the above listed services differs across different verification environments described earlier. Accordingly, the usage of the primitives by the device driver code 110 also differs for different verification environments.

Figure 2A:
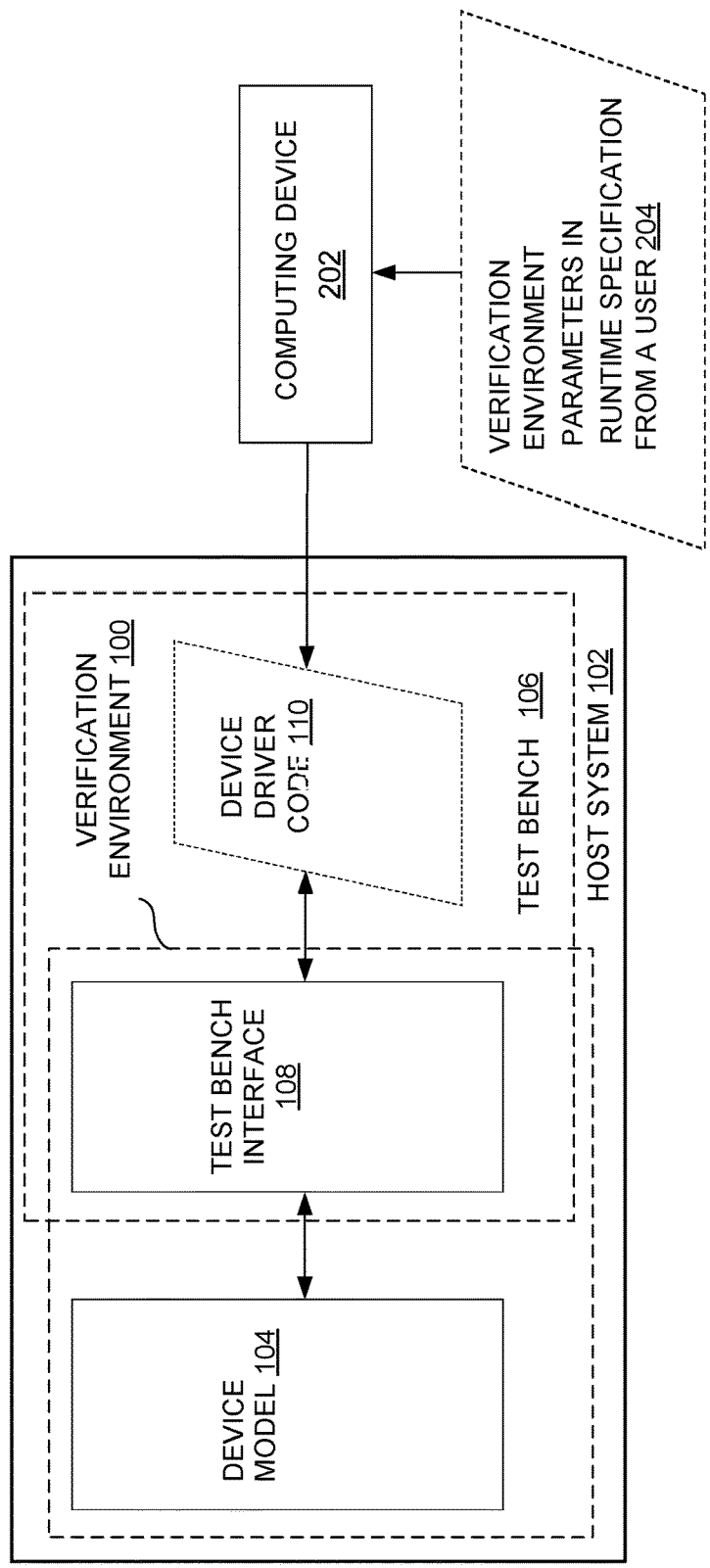
FIG. 2A depicts a block diagram representation of a system for automatically generating a device driver for implementation in a verification environment, in accordance with an embodiment herein.

FIG. 2A depicts a block diagram representation of a system for generating device driver code 110, in the verification environment 100, such as 100 of FIG. 1, in accordance with an embodiment herein. The system 200 includes the host system 102 of FIG. 1 communicatively associated with a computing device 202 (e.g. a device driver generator). In an embodiment, the computing device 202 may be an external to the host system 102, such as on cloud. In some other embodiments, the computing device 202 may be employed within the host system 102 as depicted in FIG. 1. The computing device 202 receives one or more verification environment parameters 204 in runtime specification from a user. The term "verification environment parameters" refers to one or more parameters that describes various aspects of the verification environment 100 required for generating the device driver code 110 for enabling the communication between the test bench 106 and the device model 104 in the verification environment 100. The computing device 202 generates the device driver code 110 for enabling the communication between the test bench 106 and the device model 104 based on the received run time specification (RTS) of the verification environment 100. The device model 104 may be SystemC of a device. The run time specification is in a formal language and it indicates a plurality of characteristics of a runtime environment. The device driver code 110 communicates with the device model 104 (using for example, the test bench interface 108), and executes as a part of the test bench 106 instead of executing on a processor (as is the case when device driver code 110 has to communicate with the device model 104 in its physical form). In one embodiment, the test bench 106 is developed in one or more test bench development languages like System Verilog (SV) and C. In an embodiment, the computing device 202 may be executed based on one or more test bench development languages. In one embodiment, the device driver code 110 (e.g. a device driver software) is developed in a language different from the test bench development language.

Figure 2B:
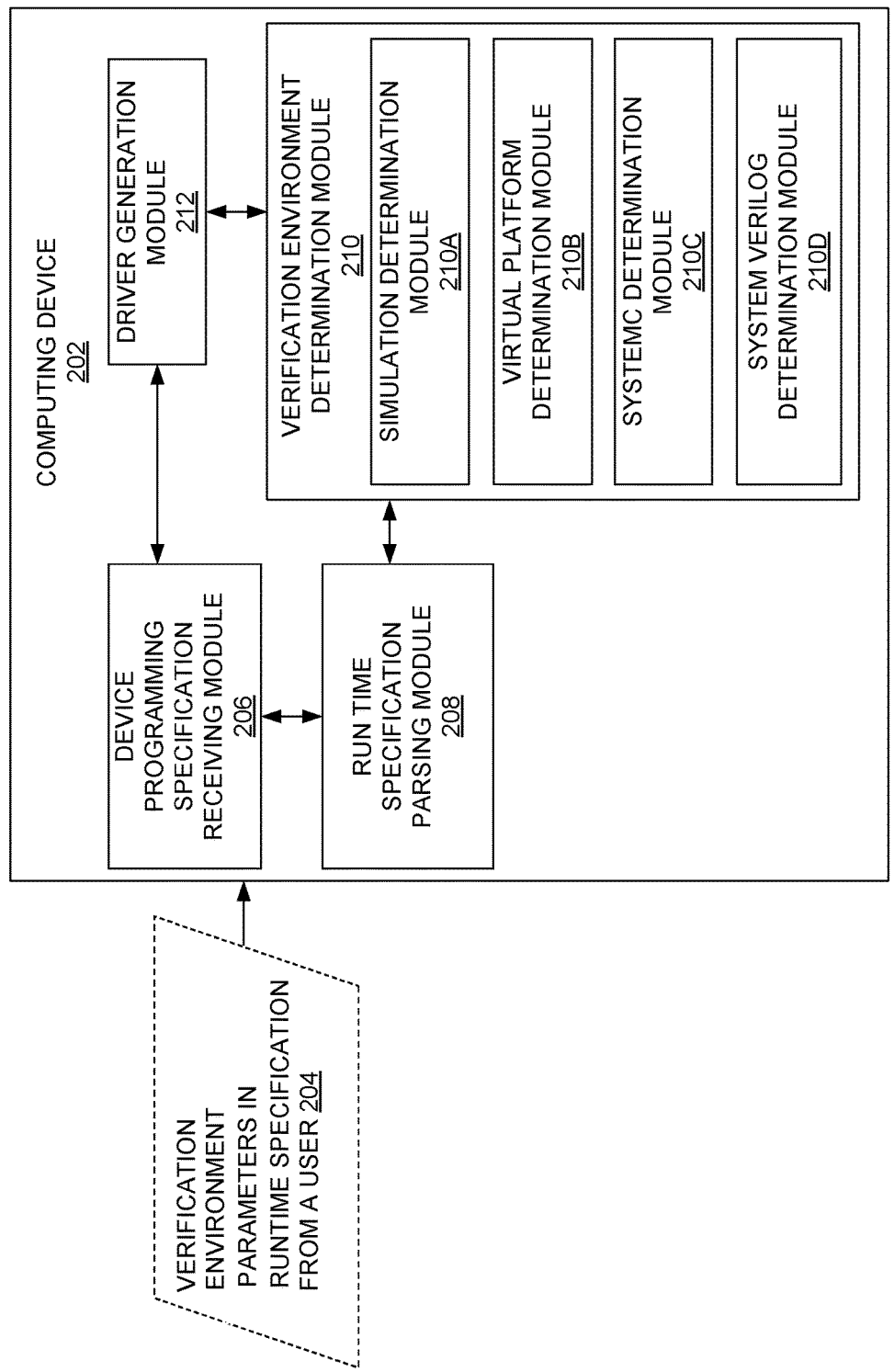
FIG. 2B depicts a block diagram representation of an exploded view of the computing device of system of FIG. 2A, in accordance with an embodiment herein.
Figure 4A:
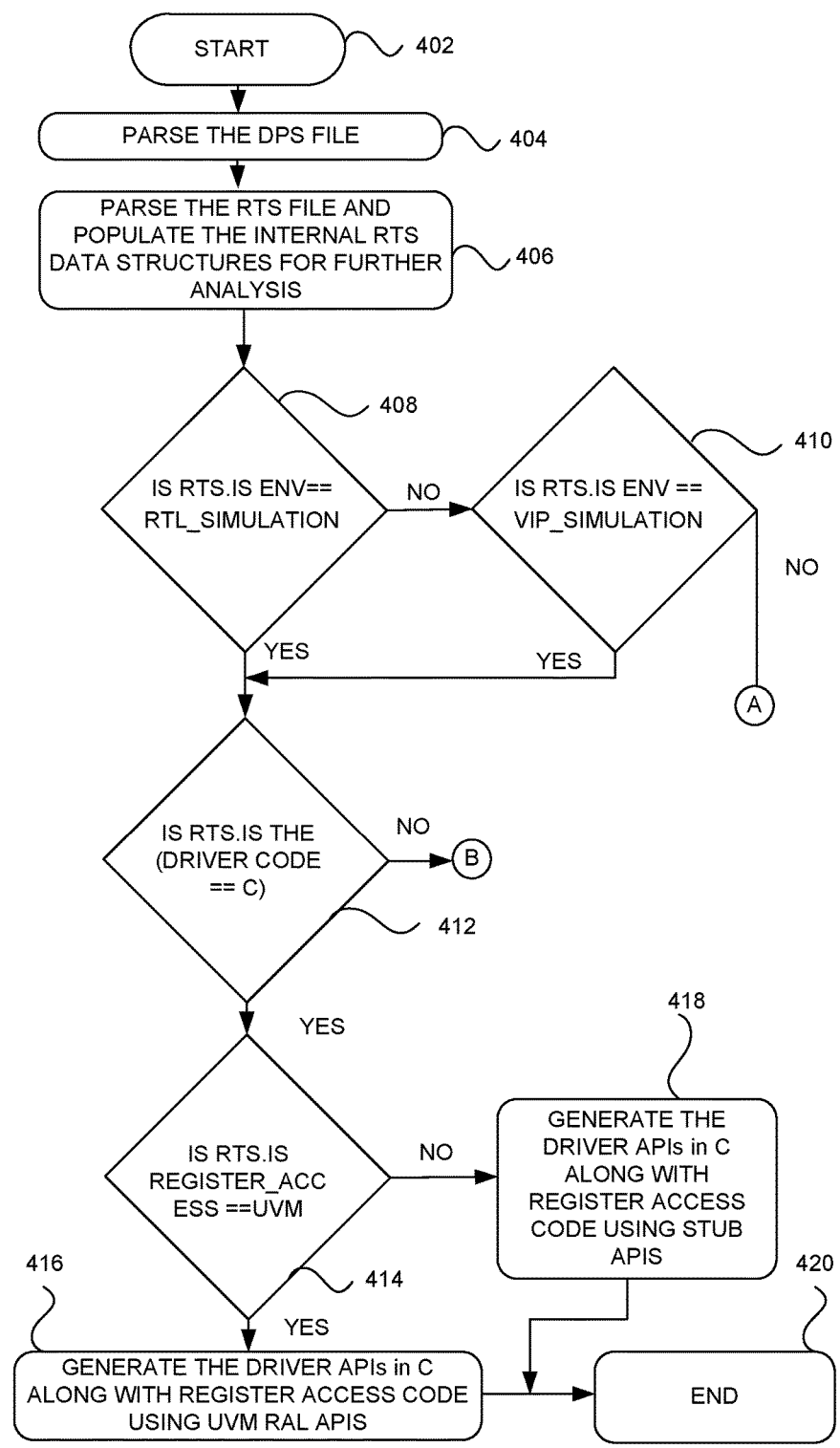
FIGS. 4A-4D are flow diagrams illustrating a method of generating a device driver code for implementation in verification environments, in accordance with an embodiment herein.
Figure 4B:
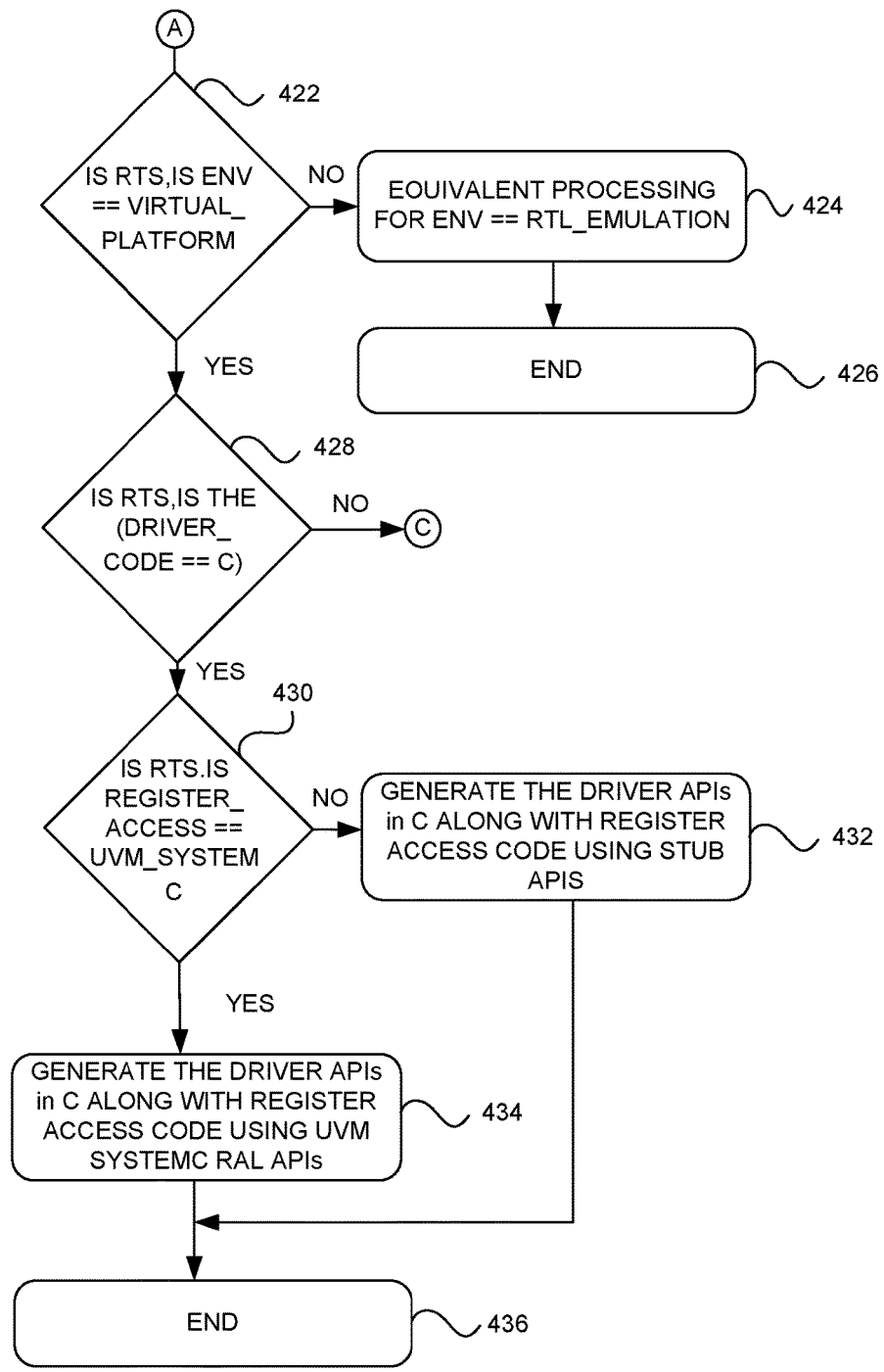
Figure 4C:
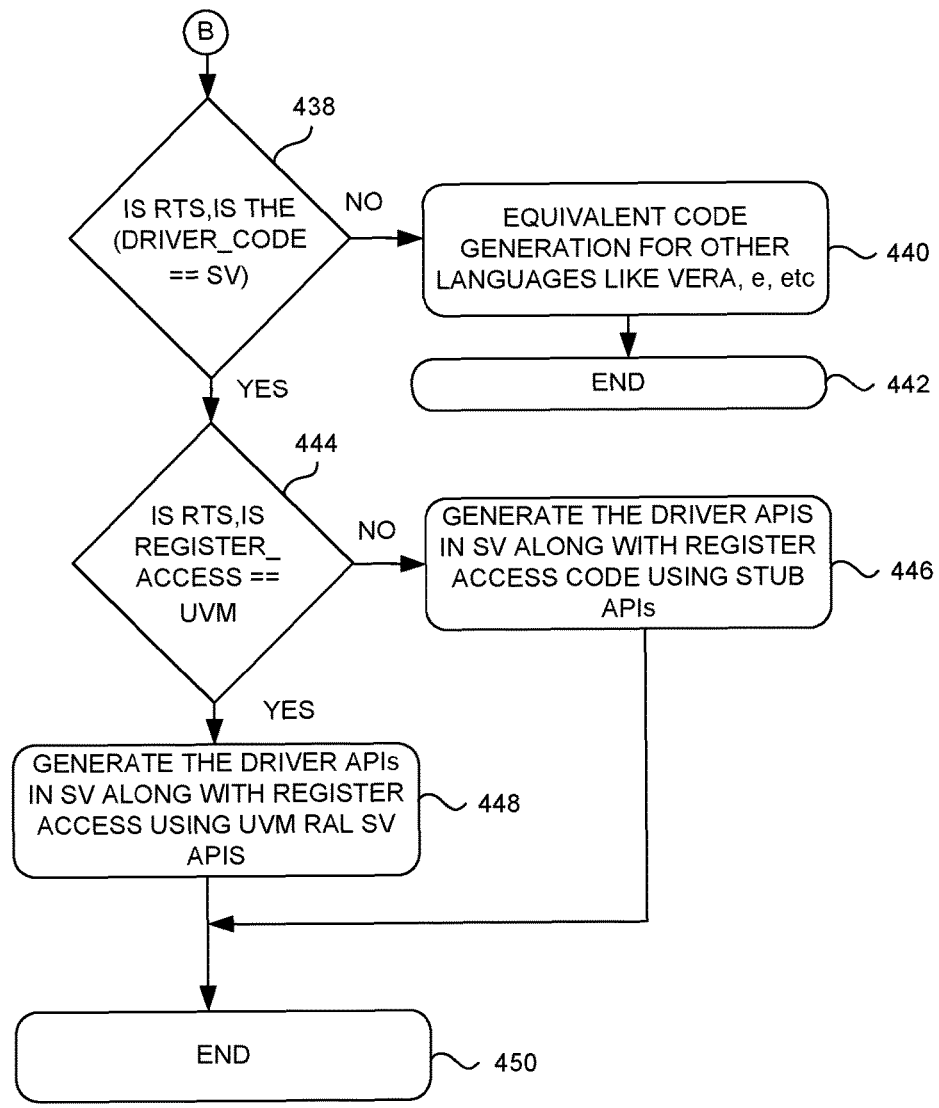
Figure 4D:
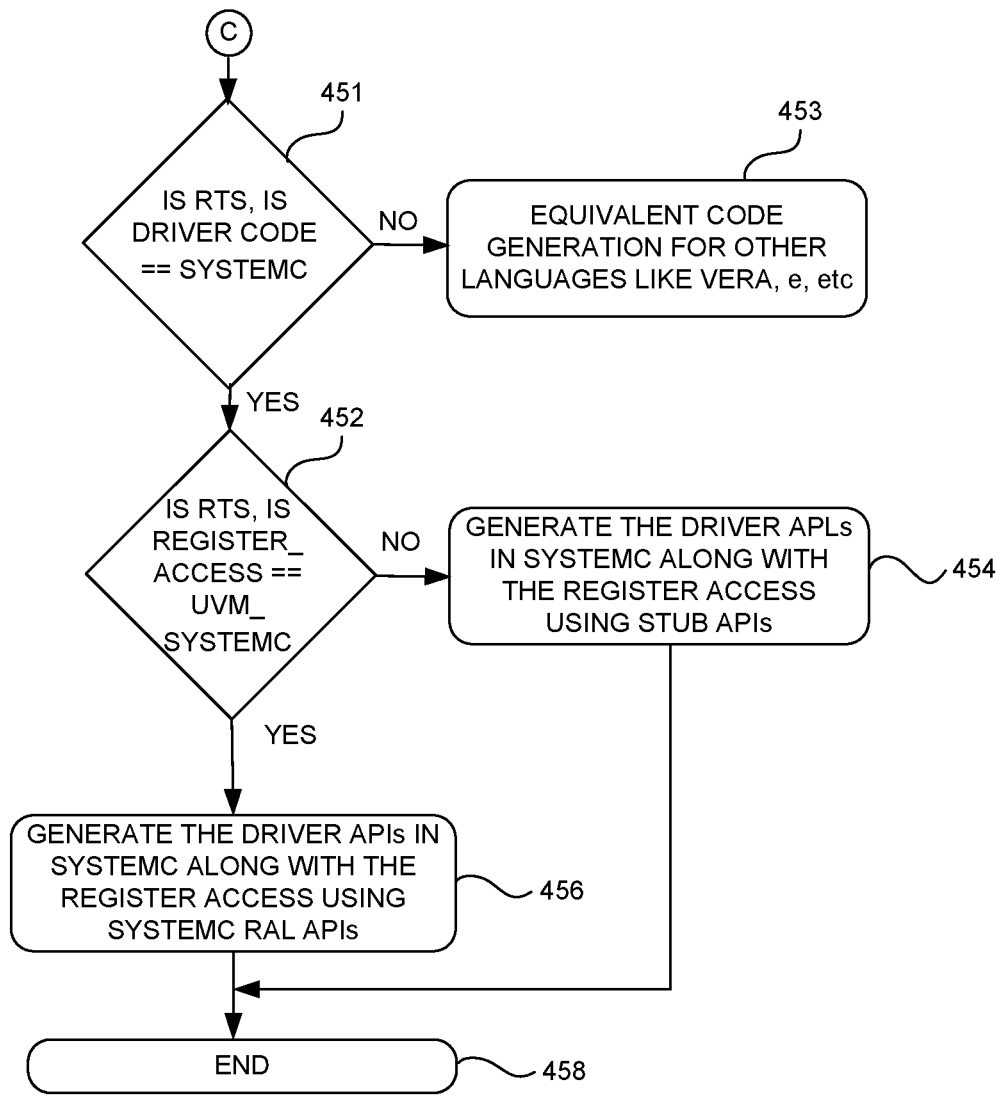

FIG. 2B depicts a block diagram representation of an exploded view of the computing device 202 of FIG. 2A, in accordance with an embodiment. In an embodiment, the computing device 202 may include (a) a device driver generator tool, (b) a memory unit and (c) a processor. The device driver generator tool generates the device driver code 110 for the device model 104. The memory unit may store (i) a database and (ii) a set of modules. The database may store the device driver codes. The processor executes a set of modules. The set of modules include a device programming specification receiving module 206, a run time specification parsing module 208, a verification environment determination module 210 and a driver generation module 212. The verification environment determination module 210 includes a simulation determination module 210A, a virtual platform determination module 210B, a SystemC determination module 210C and a System Verilog determination module 210D. The device programming specification receiving module 206 receives at least one of a device programming specification that includes aspects associated with an operation of a device model 104 in a verification environment 100 used for determining a type of device driver code 110 to be generated. The device programming specification receiving module 206 includes a device programming specification parsing module that parses a file that includes a device programming specification. The device programming specification is in a formal language and it indicates a plurality of characteristics of the device model 104. The run time specification parsing module 208 also parses a run time specification (RTS) file including one or more verification environment parameters in runtime specification provided by the user and populates an internal RTS data structure. The verification environment determination module 210 determines whether the verification environment 100 equals to a part of a simulation/simulation in the RTS. In an embodiment, the part of the simulation/emulation is selected from a group comprising a Verification IP (VIP) simulation, a register transfer level (RTL) simulation, an RTL emulation and a virtual platform. The verification environment determination module 210 determines a pre-determined output programming language for the generated device driver code 110 and communicates the same to the driver generation module 212 so as to generate the device driver code 110 in the predetermined output programming language such as C language. The driver generation module 212 obtains the pre-determined output programming language and generates the device driver code 110 to enable a communication between the test bench interface 108 and the device model 104 in the verification environment 100 to test the device model 104 when the verification environment 100 is equal to the simulation/emulation in the run time specification. The verification environment determination module 210 determines whether the verification environment 100 equals to the VIP simulation. If the verification environment 100 is equal to the VIP simulation or the RTL simulation then the simulation determination module 210A of the verification environment determination module 210 determines whether the register access equals to a universal verification methodology (UVM). If the register access is equal to UVM then the driver generation module 212 generates a device driver code 110 in the C language with a register access code using UVM RAL Application programming interface.

The simulation determination module 210A of the verification environment determination module 210 also determines if the generated device driver code 110 is in a pre-determined output programming language, such as C language. If for example, the generated driver code 110 is in C language then the simulation determination module 210A of the verification environment determination module 210 determines whether the register access equals to universal verification methodology (UVM) in the VIP simulation or the RTL simulation. If the register access is equal to UVM, then the driver generation module 212 generates a device driver code 110 in C language with a register access code using UVM RAL API. Else, the driver generation module 212 generates the device driver code 110 in the C language with a register access code using a small program routine (stub) API.

If the verification environment 100 is not equal to VIP simulation then the virtual platform determination module 210B of the verification environment determination module 210 determines whether the verification environment 100 equals to virtual platform when the verification environment 100 is not equal to the VIP simulation. If the verification environment 100 is equal to the virtual platform, then the virtual platform determination module 210B of the verification environment determination module 210 determines whether the device driver code 100 is in the C language (e.g. the pre-determined output programming language). Else, if the verification environment 100 is not equal to virtual platform, the virtual platform determination module 210B of the verification environment determination module 210 determines whether the verification environment 100 equals to the RTL emulation. In an embodiment, the verification environment determination module 210 determines whether the device driver code 110 is in the pre-determined output programming language when the verification environment 100 is equal to the RTL emulation. The verification environment determination module 210 further determines whether a register access equals to a universal verification methodology (UVM) when the device driver code is in the pre-determined output programming language in the RTL emulation. If the register access is equal to the UVM then the driver generation module 212 generates the device driver code 110 in the pre-determined output programming language along with a register access code using UVM register abstraction layer (RAL) application programming interface (API) in the RTL emulation. Else, the driver generation module 212 generates the device driver code 110 in the pre-determined output programming language using stub API's in the RTL emulation. If the device driver code 110 in the C language then the SystemC determination module 210C of verification environment determination module 210 determines whether the register access equals to a UVM_SystemC. If the register access is equal to the UVM_SystemC, then the driver generation module 212 generates the device driver code 110 in the C language with a register access code using UVM_SystemC RAL Application programming interface. If the register access is not equal to UVM_SystemC, the driver generation module 212 generates the device driver code 110 in the pre-determined output programming language such as the C language with a register access code using a stub API.

In an embodiment, the System Verilog determination module 210D of the verification environment determination module 210 determines whether the device driver code 110 equals to a System Verilog (SV) when the device driver code 110 is not in the pre-determined output programming language (e.g. the C language) in the VIP simulation or the RTL simulation. If the device driver code 110 is not equal to the system Verilog, then the driver generation module 212 generates the device driver code 110 in other languages like Vera E, Python, Perl and the like, based on the device RTL. Alternatively, if the device driver code 110 is equal to the system Verilog, then the System Verilog determination module 210D of verification environment determination module 210 determines whether the register access equals to the UVM. If the register access is equal to UVM, then the driver generation module 212 generates the device driver code 110 in a System Verilog language with a register access code using UVM RAL system verilog API. Else, the driver generation module 212 generates the device driver code 110 in a System-Verilog (SV) language with a register access code using a stub API. In an embodiment, the System Verilog determination module 210D further determines whether the device driver code 110 equals to a System Verilog (SV) when the device driver code 110 is not in the pre-determined output programming language in the RTL emulation. The System Verilog determination module 210D further determines whether the register access equals to the universal verification methodology when the device driver code 110 is equal to the System Verilog in the RTL emulation. If the register access equals to the UVM then the driver generation module 212 generates the device driver code 110 in the pre-determined output programming language along with a register access code using UVM register abstraction layer (RAL) application programming interface (API) in the RTL emulation. Else, the driver generation module 212 generates the device driver code 110 in the pre-determined output programming language using stub API's in the RTL emulation. In an embodiment, upon determining that the device driver code 110 is not in the C language, the SystemC determination module 210C of the verification environment determination module 210 verifies whether the register access is equal to UVM_SystemC. If the register access is equal to the UVM_SystemC then the driver generation module 212 generates the device driver code 110 in SystemC language with a register access code using SystemC RAL API. Else, if the register access is not equal to UVM_SystemC then the driver generation module 212 generates the device driver code 110 in SystemC language with a register access code using a stub API.

Although the present embodiments have been described with reference to specific example embodiments, it will be evident that various modifications and changes may be made to these embodiments without departing from the broader spirit and scope of the various embodiments, for example, the various modules, such as the device programming specification receiving module 206, the run time specification parsing module 208, the verification environment determination module 210 and the driver generation module 212 described herein may be enabled and operated using a firmware, software and/or hardware circuitry (e.g., CMOS based logic circuitry) or any combination of hardware, firmware, and/or software (e.g., embodied in a machine readable medium). Also various network devices and methods disclosed herein may be embodied using transistors, logic gates, and electrical circuits (e.g., Application Specific Integrated (ASIC) Circuitry and/or in Digital Signal Processor (DSP) circuitry).

FIGS. 3A-3G illustrate several exemplary run time specifications (RTS) for generating a device driver code 110 according to embodiment herein. FIG. 3A illustrates an exemplary RTS capturing verification environment parameters for an RTL model of a device model 104 typically implemented in a hardware design Language like Verilog or VHDL. As shown in FIG. 3A, the attribute ENV in the OS_SPEC has the value "RTL_SIMULATION" that effectively captures verification environment parameters for an RTL model of a device model 104. Similarly OS_SPEC indicates that a bare metal driver has to be generated while REGISTER_ACCESS indicates that the register access routines of the driver will use UVM RAL. The attribute "DRIVER_CODE" indicates that the tool should generate driver software in "C". The computing device 202 (e.g. the device driver generator) generates a device driver code 110 that has to communicate with the RTL model of the device model 104 in simulation. FIG. 3B, illustrates an exemplary RTS capturing verification environment parameters for an RTL model of a device model 104 typically implemented in a hardware design Language like Verilog or VHDL. The attribute ENV in the OS_SPEC has the value "RTL_SIMULATION" that effectively captures verification environment parameters for an RTL model of a device model 104. Similarly OS_SPEC indicates that a bare metal driver has to be generated while REGISTER_ACCESS indicates that the register access routines of the driver will use UVM RAL. The attribute "DRIVER_CODE" indicates that the tool should generate device driver code 110 in system Verilog.

FIG. 3C depicts an example RTS capturing verification environment parameters for a virtual model of the device model 104 (often in language like C or SystemC). The intent of the virtual model is often to enable early software development. The virtual model itself may have to undergo testing and verification before it is handed over for early software development. The testbench software may be developed in SystemC and the device driver code 110 could be developed in C or SystemC. In an embodiment, the virtual model might be implemented using a set of C or SystemC that is synthesizable to RTL or a lower level net-list presentation using any of the high level synthesis tools. FIG. 3D depicts an example RTS capturing verification environment parameters for a virtual model of the device model 104, specifying that the device driver code 110 may be generated in the SystemC.

FIG. 3E is a variant of the example RTS of FIG. 3A, except that it specifies that the device driver code 110 is generated in system Verilog. FIG. 3F illustrates an exemplary RTS capturing verification environment parameters for a verification model of a device typically used as reference model during verification of the RTL model. It is also used to model the interface end of the RTL model. For example if the RTL model is of a USB Host Controller, then the verification model will be of a USB device controller to connect to the interface of the Host controller RTL. FIG. 3G illustrates an exemplary RTS capturing verification environment parameters for an RTL model being verified on an emulation box (a specialized hardware) possibly along with other RTL models.

FIGS. 4A-4D depict a flow chart illustrating a method of generating a device driver code 110 for verification environments through a computing device 202, according to an embodiment herein. The method begins at step 402, In step 404, a file including a device programming specification describing aspects associated with operation of a device model 104 in a verification environment (such as verification environment 100 of FIG. 1) received from a user of the computing device 202 (e.g. the device driver generator) for determining a type of device driver code 110 to be generated is parsed by the computing device 202. In an embodiment, the device programming specification is manually specified by the user to the computing device 202. In step 406, the computing device 202 (device driver generator) parses a RTS (run time specification) file and populates an internal RTS data structure. In step 408, it is checked whether the verification environment 100 is equal to simulation in RTS. If the verification environment 100 is equal to simulation in RTS at step 408, then the computing device 202 executes to generate a device driver code 110. Else, (if No) step 410 is performed. In step 412, it is checked whether the generated device driver code 110 (e.g. a driver API) is in C language. If the generated device driver code 110 is in the C language (if Yes) then step 414 is performed.

Else, (if No) step 438 is performed. In step 414, it is checked whether the register access is equal to universal verification methodology (UVM). If the register access is equal to UVM (if Yes) then the computing device 202 generates a device driver code 110 (Application programming interface) in the C language (e.g. the pre-determined output programming language) with a register access code using UVM RAL Application programming interface in step 418. Else, (if No the computing device 202 generates the device driver code 110 (e.g. the driver API) in C language with a register access code using a small program routine (stub) API in step 416. At step 420, the process of device driver code generation in a RTS simulation and/or a virtual simulation completes. In step 410, it is checked whether the verification environment 100 is equal to VIP simulation. If the verification environment 100 is equal to VIP simulation (if Yes) then step 412 is repeated. Else, (if No) step 422 is performed. In step 422, it is checked whether the verification environment 100 is equal to virtual platform in RTS. If the verification environment 100 is equal to virtual platform (if Yes) step 428 is performed. Else, (if No) it is checked whether the verification environment 100 is equal to RTL emulation in step 424. In an embodiment, it is checked whether the device driver code 110 is in the pre-determined output programming language when the verification environment 100 is equal to the RTL emulation. It is further checked whether a register access equals to a universal verification methodology (UVM) when the device driver code 110 is in the pre-determined output programming language in the RTL emulation. If the register access is equal to the UVM then the computing device 202 generates the device driver code 110 in the pre-determined output programming language along with a register access code using UVM register abstraction layer (RAL) application programming interface (API) in the RTL emulation. Else, the computing device 202 generates the device driver code 110 in the pre-determined output programming language using stub API's in the RTL emulation. In another embodiment, it is checked whether the device driver code 110 equals to a System Verilog (SV) when the device driver code 110 is not in the pre-determined output programming language in the RTL emulation. It is further checked whether the register access equals to the universal verification methodology when the device driver code 110 is equal to the System Verilog in the RTL emulation. If the register access equals to the UVM then the computing device 202 generates the device driver code 110 in the pre-determined output programming language along with a register access code using UVM register abstraction layer (RAL) application programming interface (API) in the RTL emulation. Else, the computing device 202 generates the device driver code 110 in the pre-determined output programming language using stub API's in the RTL emulation. At step 426, the process of device driver code generation for RTL emulation ends. In step 428, it is checked whether the device driver code 110 is in C language. If the device driver code 110 in C language (if Yes) then step 430 is performed. Else, (if No) step 451 is performed.

In step 430, it is checked whether the register access is equal to a UVM_SystemC. If the register access is equal to a UVM_SystemC (if Yes) then the device driver code 110 is generated in C language with a register access code using UVM_SystemC RAL Application programming interface in step 434. Else, (if No) the computing device 202 generates the device driver code 110 in the C language with a register access code using a stub Application programming interface in step 432. In step 436, the device driver code generation is completed in a virtual platform.

In step 438, it is checked whether the device driver code 110 is equal to a System Verilog. If the driver code is equal to a System Verilog (if Yes) the step 444 is performed. Else, (if No) the device driver code 110 is generated in other languages like Vera e, Python, Perl and etc, based on the device RTL 102 in step 440. In step 442, the device driver code generation process ends. In step 444, it is checked whether the register access is equal to UVM. If the register access is equal to UVM (if Yes) then the device driver code 110 (Application programming interface) is generated in a system verilog (SV) language with a register access code using UVM RAL system verilog Application programming interface (API) in step 448. Else, (if No) the computing device 202 generates the device driver code 110 in a System Verilog (SV) language with a register access code using a stub Application programming interface (API) in step 446. In step 450, the device driver code generation is completed in a RTS simulation using the device driver code 110 in a System Verilog language.

In step 451, it is checked whether the device driver code 110 is equal to SystemC. If the device driver code 110 is equal to the SystemC, it is checked whether the register access is equal to UVM_SystemC in step 452. Else, the device driver code 110 is generated in other languages like Vera e, Python, Perl and etc, based on the device RTL 102 in step 453. If the register access is equal to UVM_SystemC (if Yes) then the computing device 202 generates the device driver code 110 (Application programming interface) in SystemC language with a register access code using SystemC RAL Application programming interface (API) in step 456. Else, (if No) the computing device 202 generates the device driver code 110 (Application programming interface) in SystemC language with a register access code using a stub Application programming interface (API) in step 454. In step 458, the device driver code generation is completed in a virtual platform using the device driver code 110 in a SystemC language.

Figure 5:
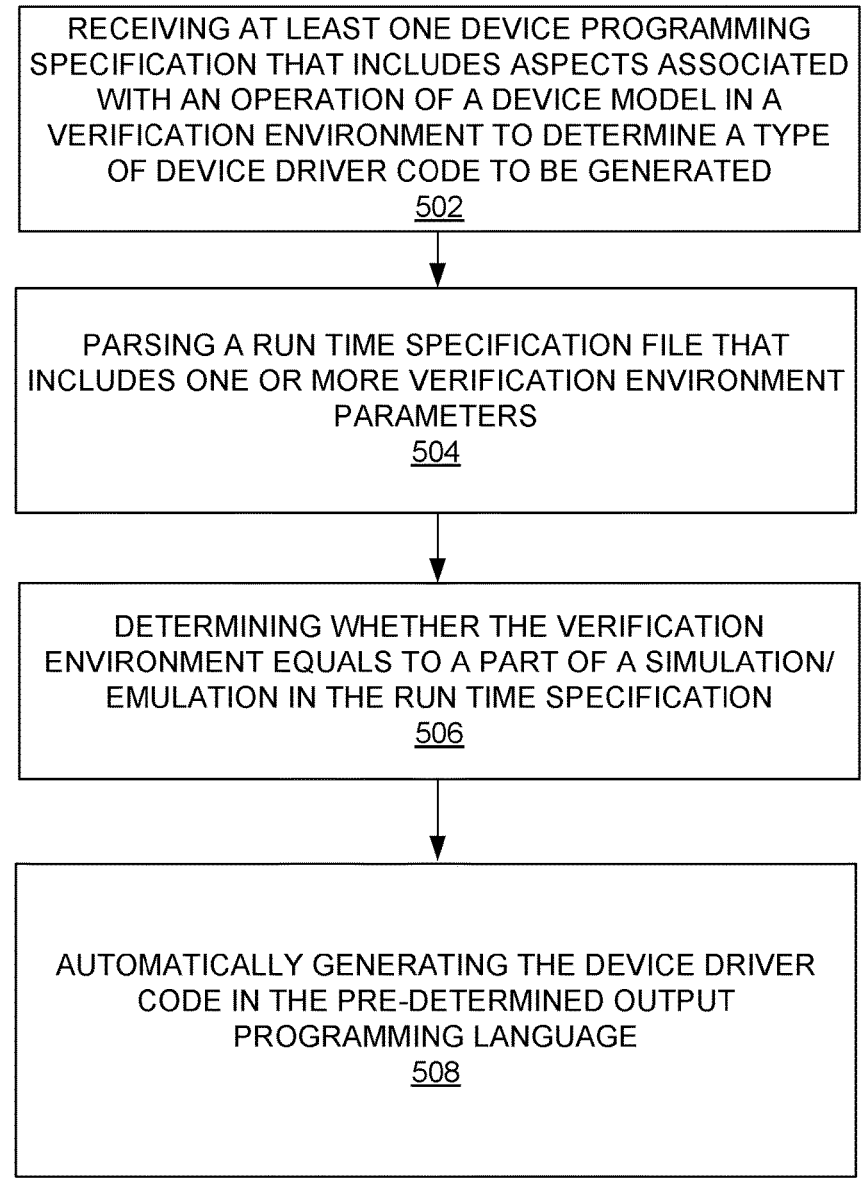
FIG. 5 is a flow diagram that illustrates a method for automatically generating device driver codes for a device model based on an operation of the device model in verification environments in accordance with an embodiment herein.

FIG. 5 is a flow diagram that illustrates a method for automatically generating device driver codes for a device model 104 based on an operation of the device model 104 in verification environments in accordance with an embodiment herein. At step 502, at least one device programming specification that includes aspects associated with an operation of the device model 104 is received in the verification environment 100 to determine a type of device driver code 110 to be generated. At step 504, a run time specification file that includes one or more verification environment parameters are parsed in the run time specification. At step 506, it determines whether the verification environment 100 equals to a part of a simulation/emulation in the run time specification. A pre-determined output programming language (e.g. a C language) is determined for the device driver code 110 and communicated the pre-determined output programming language such as C language. In an embodiment, the part of the simulation/emulation is selected from a group comprising a Verification IP (VIP) simulation, a register transfer level (RTL) simulation, an RTL emulation and a virtual platform. At step 508, the device driver code 110 is generated in the pre-determined output programming language. The device driver code is generated so that it is specific to the simulation or the emulation in the run time specification.

Figure 6:
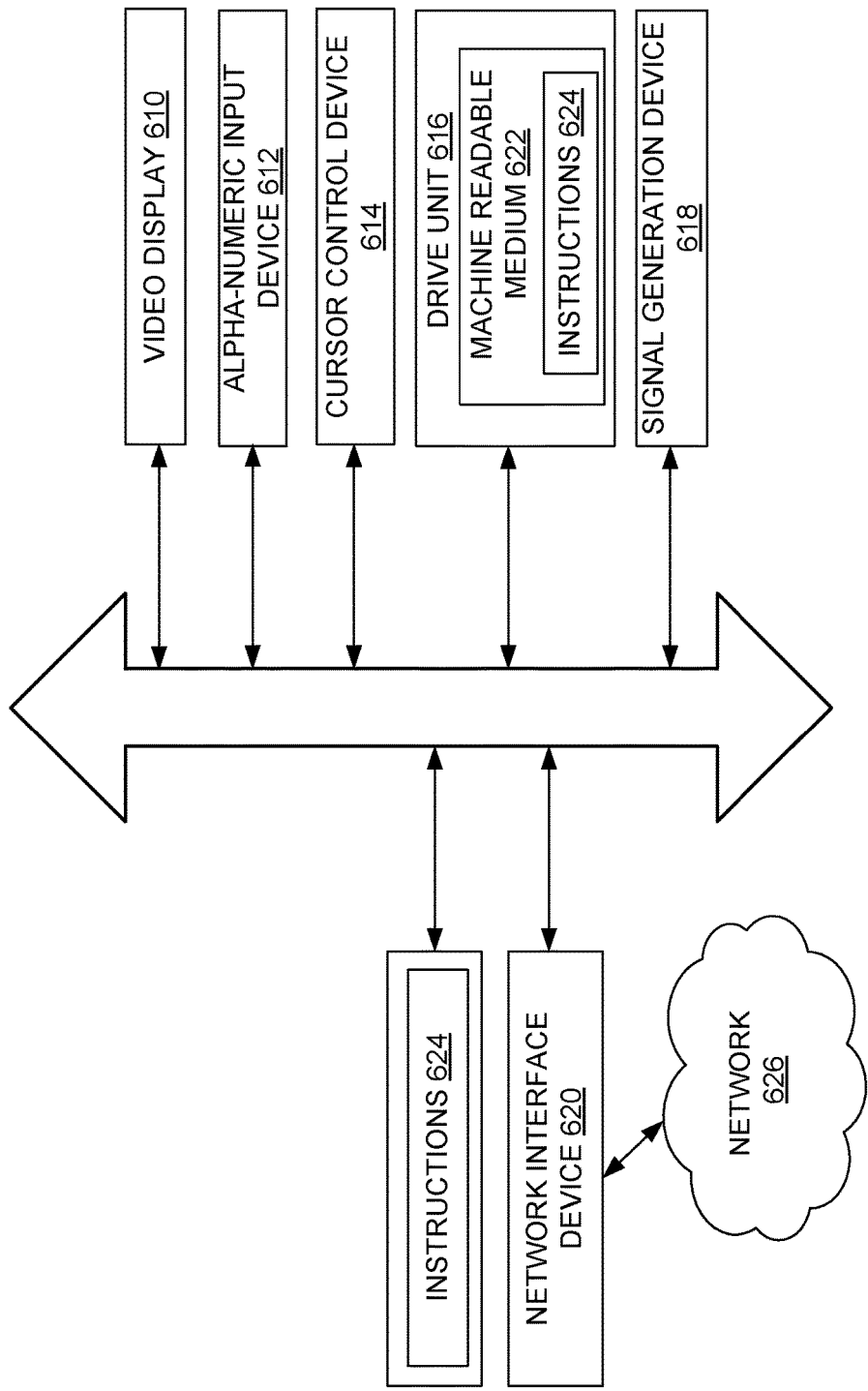
FIG. 6 illustrates a schematic diagram of a computer architecture used, in accordance with the embodiment herein.

FIG. 6 depicts a functional block diagram of an example general-purpose digital computing environment that may be used to implement various aspects of the present technology disclosed herein (such as for example, a computing device 202, a base station or a system). The general purpose digital computing environment of FIG. 6 includes a processor, a main memory, a static memory, a bus, a video display 610, an alpha-numeric input device 612, a cursor control device 614, a drive unit 616, a signal generation device 618, a network interface device 620, a machine readable medium 622, instructions 624, and a network 626, according to one embodiment.

The processor may be include, but is not limited to a microprocessor, a state machine, an application specific integrated circuit, a field programmable gate array, etc. (e.g., an Intel® Pentium® processor). The main memory may be a dynamic random access memory and/or a primary memory of a computer system. The static memory may include for example a hard disk drive for reading from and writing to a hard disk (not shown), a magnetic disk drive for reading from or writing to a removable magnetic disk, or an optical disk drive for reading from or writing to a removable optical disk such as a CD ROM or other optical media. The drives and their associated computer-readable media provide non-volatile storage of computer readable instructions, data structures, program modules and other data for a computer. It will be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the example general purpose computing environment.

The bus may be an interconnection between various circuits and/or structures of the purpose computing environment. The video display 610 may provide a graphical representation of information on the data processing system. The alpha-numeric input device 612 may be a keypad, a keyboard and/or any other input device of text (e.g., a special device to aid the physically handicapped), a microphone, joystick, game pad, satellite dish, scanner or the like. The alpha-numeric input device 612 is often connected to the processing unit through a serial port interface that is coupled to the system bus, but may be connected by other interfaces, such as a parallel port, game port or a universal serial bus (USB).

The cursor control device 614 may be a pointing device such as a mouse. The drive unit 616 may be the hard drive, a storage system, and/or other longer term storage subsystem. The signal generation device 618 may be a bios and/or a functional operating system of the data processing system. The network interface device 620 may be a device that performs interface functions such as code conversion, protocol conversion and/or buffering required for communication to and from the network 626. The machine readable medium 622 may provide instructions on which any of the methods disclosed herein may be performed. The instructions 624 may provide source code and/or data code to the processor 602 to enable any one or more operations disclosed herein.

The system and method disclosed herein enables generation of device driver codes that can be used in design and verification of the device before the device model 104 is available in its physical form. The runtime environment differs from the environment in which the device driver code 110 communicates with the device model 110 in its actual physical form (such as with the presence of a processor on which the driver code executes). The system and method disclosed herein enables generating and implementing of device driver codes in various types of verification environments using a common device programming specification and without requiring generation of the device programming specification separately for each type of verification environment 100. Also, implementing the device driver codes through the system and method disclosed herein decreases effort and cost of implementation and also decreases a probability of errors in implementation as the process is automated based on the runtime environment parameters provided by a user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for automatically generating device driver codes for a device model based on an operation of said device model in verification environments, said system comprising:
    a computing device that comprises (a) a device driver generator tool that generates a device driver code for said device model, (b) a memory unit that stores (i) a database and (ii) a set of modules, and (c) a processor that executes said set of modules, wherein said set of modules comprise:
        a device programming specification receiving module, implemented by said processor, that receives at least one device programming specification that comprises aspects associated with an operation of said device model in said verification environment to determine a type of device driver code to be generated, wherein said device programming specification receiving module comprises a device programming specification parsing module parses a file that comprises said device programming specification;
        a run time specification parsing module, implemented by said processor, that parses a run time specification file that comprises a plurality of verification environment parameters in run time specification;
        a verification environment determination module, implemented by said processor, that determines whether said verification environment equals to a part of a simulation or an emulation in said run time specification, wherein said part of said simulation or said emulation is selected from a group comprising a Verification IP (VIP) simulation, a register transfer level (RTL) simulation, an RTL emulation or a virtual platform until a match is found, wherein said verification environment determination module determines a pre-determined output programming language for said device driver code and communicates said pre-determined output programming language; and
        a driver generation module, implemented by said processor, automatically generates said device driver code in said pre-determined output programming language, wherein said device driver code is generated so that it is specific to said simulation or said emulation in said run time specification.

2. The system of claim 1, wherein said verification environment determination module further comprises a simulation determination module, wherein said simulation determination module
    determines whether said verification environment equals to said RTL simulation;
    determines whether said verification environment equals to said VIP simulation;
    determines whether said device driver code is in said pre-determined output programming language when said verification environment is equal to said VIP simulation or said RTL simulation; and
    determines whether a register access equals to a universal verification methodology (UVM) when said device driver code is in said pre-determined output programming language in said VIP simulation or said RTL simulation.

3. The system of claim 2, wherein said verification environment determination module (210) further comprises a virtual platform determination module, wherein said virtual platform determination module
    determines whether said verification environment equals to a virtual platform;
    determines whether said device driver code is in said pre-determined output programming language when said verification environment is equal to said virtual platform;
    determines whether register access equals UVM_SystemC when said device driver code is in said pre-determined output programming language in said virtual platform; and
    determines whether said verification environment equals to said RTL emulation.

4. The system of claim 3, wherein said verification environment determination module further comprises a SystemC determination module, wherein said SystemC determination module
    determines whether device driver code equals to SystemC; and
    determines whether said register access equals to a UVM_SystemC when said device driver code is equal to said SystemC.

5. The system of claim 2, wherein said verification environment determination module further comprises a System Verilog determination module, wherein said System Verilog determination module
    determines whether said device driver code equals to a System Verilog (SV); and
    determines whether said register access equals to said universal verification methodology when said device driver code is equal to said System Verilog in said VIP simulation or said RTL simulation.

6. The system of claim 2, wherein said driver generation module further
- generates said device driver code in said pre-determined output programming language along with a register access code using UVM register abstraction layer (RAL) application programming interface (API) when said register access is equal to said universal verification methodology (UVM) in said RTL simulation or said VIP simulation; or
- generates said device driver code in said pre-determined output programming language using stub API's when said register access is not equal to universal verification methodology in said RTL simulation or said VIP simulation.

7. The system of claim 3, wherein said driver generation module further
- generates said device driver code in said pre-determined output programming language along with a register access code using UVM_SystemC RAL API's when said register access is equal to said UVM_SystemC in said virtual platform; or
- generates said device driver code in said pre-determined output programming language along with a register access code using said stub API's when said register access is not equal to said UVM_ SystemC in said virtual platform.

8. The system of claim 4, wherein said driver generation module further
- generates said device driver code in said SystemC along with a register access code using SystemC RAL API when said register access is equal to said UVM_SystemC in said virtual platform; or
- generates said device driver code in said SystemC along with a register access code using stub API's when said register access is not equal to said UVM_SystemC in said virtual platform.

9. The system of claim 5, wherein said driver generation module further generates said device driver code in other output programming language when said device driver code is not equal to said System Verilog, wherein said other output programming language is selected from a group comprising Vera, E, Python or Perl.

10. The system of claim 5, wherein said driver generation module further
- generates said device driver code in said System Verilog along with a register access code using UVM RAL System Verilog API's when said register access is equal to said universal verification methodology (UVM) in said VIP simulation or RTL simulation; or
- generates said device driver code in said System Verilog along with a register access code using stub API's when said register access is not equal to said universal verification methodology (UVM) in said VIP simulation or said RTL simulation.

11. The system of claim 3, wherein said verification environment determination module
- determines whether said device driver code is in said pre-determined output programming language when said verification environment is equal to said RTL emulation; and
- determines whether a register access equals to a universal verification methodology (UVM) when said device driver code is in said pre-determined output programming language in said RTL emulation.

12. The system of claim 11, wherein said verification environment determination module further comprises said System Verilog determination module, wherein said System Verilog determination module
- determines whether said device driver code equals to a System Verilog (SV); and
- determines whether said register access equals to said universal verification methodology when said device driver code is equal to said System Verilog in said RTL emulation.

13. The system of claim 12, wherein said driver generation module further
- generates said device driver code in said pre-determined output programming language along with a register access code using UVM register abstraction layer (RAL) application programming interface (API) when said register access is equal to said universal verification methodology (UVM) in said RTL emulation; or
- generates said device driver code in said pre-determined output programming language using stub API's when said register access is not equal to the universal verification methodology in said RTL emulation.

14. The system of claim 12, wherein said driver generation module further
- generates said device driver code in said System Verilog along with a register access code using UVM RAL System Verilog API's when said register access is equal to said universal verification methodology (UVM) in said RTL emulation; or
- generates said device driver code in said System Verilog along with a register access code using stub API's when said register access is not equal to said universal verification methodology in said RTL emulation.

15. One or more non-transitory computer readable storage mediums storing one or more sequences of instructions, which when executed by one or more processors, performs a method for generating device driver codes for a device model based on an operation of said device model in verification environments, said method comprising:
- receiving at least one device programming specification that comprises aspects associated with an operation of said device model in said verification environment to determine a type of device driver code to be generated;
- parsing a run time specification file that comprises a plurality of verification environment parameters in run time specification;
- determining whether said verification environment equals to a part of a Verification IP (VIP) simulation, a register transfer level (RTL) simulation, an RTL emulation or a virtual platform until a match is found;
- automatically generating said device driver code in said pre-determined output programming language, wherein said device driver code is generated so that it is specific to said simulation or said emulation in said run time specification.

16. The one or more non-transitory computer readable storage mediums storing one or more sequences of instructions of claim 15, wherein said determining further comprises the step of:
- determining whether said verification environment equals to said RTL simulation;
- determining whether said verification environment equals to said VIP simulation in said run time specification;
- determining whether said device driver code is in said pre-determined output programming language when said verification environment is equal to said VIP simulation or said RTL simulation; and
- determining whether a register access equals to a universal verification methodology (UVM) when said device driver code is in said pre-determined output programming language in said VIP simulation or said RTL simulation.

17. The one or more non-transitory computer readable storage mediums storing one or more sequences of instructions of claim 16, wherein said method further comprises the step of:

generating said device driver code in said pre-determined output programming language along with a register access code using UVM register abstraction layer (RAL) application programming interface (API) when said register access is equal to said universal verification methodology (UVM) in said RTL simulation or said VIP simulation; or generating said device driver code in said pre-determined output programming language using stub API's when said register access is not equal to universal verification methodology in said RTL simulation or said VIP simulation.

18. The computer implemented method for generating device driver codes for a device model based on an operation of said device model in verification environments, wherein said method comprising:

receiving at least one device programming specification that comprises aspects associated with an operation of said device model in said verification environment to determine a type of device driver code to be generated;

parsing a run time specification file that comprises a plurality of verification environment parameters in run time specification;

determining whether said verification environment equals to a part of a Verification IP (VIP) simulation, a register transfer level (RTL) simulation, an RTL emulation or a virtual platform until a match is found;

automatically generating said device driver code in said pre-determined output programming language, wherein said device driver code is generated so that it is specific to said simulation or said emulation in said run time specification.

19. The computer implemented method of 18, wherein said method further comprises the step of:

determining whether said verification environment equals to said RTL simulation;

determining whether said verification environment equals to said VIP simulation in said run time specification;

determining whether said device driver code is in said pre-determined output programming language when said verification environment is equal to said VIP simulation or said RTL simulation; and determining whether a register access equals to a universal verification methodology (UVM) when said device driver code is in said pre-determined output programming language in said VIP simulation or said RTL simulation.

* * * * *